United States Patent Office 3,562,301
Patented Feb. 9, 1971

3,562,301
OIL REVERSION
Frederick H. Fryer and George B. Crump, Indianapolis, Ind., assignors to Standard Brands Incorporated, New York, N.Y., a corporation of Delaware
No Drawing. Continuation-in-part of application Ser. No. 370,675, May 27, 1964. This application Sept. 4, 1968, Ser. No. 757,450
Int. Cl. C11b 3/04, 5/00
U.S. Cl. 260—398.5
10 Claims

ABSTRACT OF THE DISCLOSURE

The invention relates to a method of refining edible vegetable and marine oils. Vegetable and marine oils tend to revert in flavor and odor on storage. Treating such oils with small amounts of hydrogen chloride under substantially anhydrous conditions substantially prevents the oils from undergoing reversion on storage. Also, when oils which have reverted are treated with small amounts of hydrogen chloride under substantially anhydrous conditions the original bland flavor of the oils is restored.

---

This application is a continuation-in-part of application Ser. No. 370,675, filed May 27, 1964, now abandoned.

The uses to which fatty oils such as vegetable and marine oils are put may generally be grouped into two broad classes, i.e., edible uses and non-edible uses. To be suitable for edible uses, the oils must be subjected to extensive refining treatments to make them bland and clear.

Crude fatty oils, depending upon the sources from which they are derived and the methods used for extracting the oils, contain varying amounts of nonglyceride impurities such as free fatty acids, mucilaginous substances and phospholipids.

Refining of fatty oils for edible uses may be accomplished in a variety of ways. The most important and generally practiced method of refining is the treatment of oils with an alkali such as caustic soda, sodium carbonate, etc. This method involves the steps of emulsifying the oils with a calculated excess of an aqueous alkali solution based on the free fatty acids present, heating the emulsion to break the same and separating the refined oil from the precipitated material. The precipitated material is known in the art as "foots" or "soapstock." In some instances, prior to alkali refining, the oils are deslimed or degummed. Desliming or degumming is designed to remove phospholipids and mucilaginous materials from oils, and is accomplished by hydrating these materials to make them insoluble in the oil. Soybean oil is commonly subjected to a desliming or degumming treatment. Desliming or degumming reduces oil losses in the subsequent alkali refining. Moreover, oils treated in this manner do not have the tendency to form precipitates when they are stored or transported for extended periods of time before they are used.

Usually, the next step in refining of oils for edible uses is a bleaching process. Bleaching is usually accomplished by contacting the oils with an adsorbent such as fuller's earth, acid-activated clay, activated carbon or the like. Bleaching may be carried out at a temperature of 220° to 240° F. under atmospheric pressure or at lower temperatures when performed under a vacuum. Usually, it is preferred to bleach under a vacuum in a closed system in order to avoid possible oxidation of the oils.

Generally, the last step is in refining of edible oils is a deodorization treatment. The objective of this treatment is to remove volatile odoriferous and flavoring substances from the oils. It is essentially a process of steam distillation whereby volatile substances are removed or stripped from the relatively non-volatile oils. This treatment is usually carried out at high temperatures and reduced pressures in order to facilitate the removal of the volatile odoriferous and flavoring substances and to substantially prevent the oils from undergoing oxidation or undue hydrolysis.

The other broad use class of fatty oils is for non-edible uses. This use, generally, does not require that the oils be subjected to the extensive refining techniques required for oils which are intended for edible purposes.

In the non-edible use area, relatively large quantities of fatty oils are used as drying oils. Drying oils are generally defined as oils that are relatively easily polymerized by the action of oxygen in air to form a film which is tough, adherent, impervious and abrasion resistant. Oils used for this purpose consist chiefly of triglycerides of a relatively high degree of unsaturation. In many cases, fatty oils are modified by heat, dehydration or isomerization in order to change their properties in such a manner as to make them more suitable as drying oils. Fish oils such as menhaden, sardine and pilchard are used as drying oils. However, since they are relatively high in saturated fatty acids, which hinder their ability to form a film of the kind enumerated above, it is generally necessary to remove substantial portions of the saturated fatty acids contained therein or subject them to a modification process.

Refined edible oils tend to undergo deleterious changes in flavor and odor on storage, i.e., they will become rancid and revert. Rancidity is generally considered to be caused by oxidation. The rate of oxidation of oils depends upon many factors, such as the degree and type of unsaturation, and the presence or absence of natural protective agents such as tocopherols. The cause of reversion is also thought by some in the art to be due to oxidation, but of different components of the oil than those that cause rancidity. An oil may be rancid but not reverted and vice versa, or an oil may be both rancid and reverted. Thus rancidity and reversion are separate and distinct phenomena. Although the exact components of the oils which tend to cause reversion are unknown, we believe that reversion somehow is related to the presence of the phospholipids. Reversion manifests itself as development of flavors and odors which are characteristic of the source from which the oils are derived. For instance, in soybean oil, reversion is typified by a beany-grassy or even a fishy odor and flavor, in cottonseed oil a phenolic-like flavor and odor, and in fish oil a fishy flavor and odor. Different oils tend to revert at different rates. Soybean oil tends to revert more quickly than the other oils generally used for edible purposes.

The principal object of the present invention is providing an improved method for refining vegetable and marine oils whereby the oils remain substantially bland for a longer period of time than they otherwise would when refined by conventional methods.

Another object of the present invention is providing a method for refining vegetable and marine oils which have reverted in flavor and odor on storage to obtain substantially bland edible oils.

These objects are attained in accordance with the present invention by treating alkali refined vegetable and marine oils under substantially anhydrous conditions with substantially anhydrous hydrogen chloride.

The method of the present invention is applicable both to edible oils which have reverted in flavor and odor and edible oils which have not reverted.

As discussed above, although we do not understand the exact cause of reversion, it seems to be somehow related to the presence of the phospholipids in the oils. In this respect, we have found that if the oils are treated with one mole of hydrogen chloride for each mole of phospholipid present, the phospholipids being calculated as lecithin, the oils will not undergo reversion and oils which have reverted will have their original odorless and flavorless characteristics restored. Smaller amounts of hydrogen chloride may be used but will not retard or prevent reversion to the same degree; that is, oils treated with smaller amounts of hydrogen chloride will tend to revert more quickly than oils treated with larger amounts of hydrogen chloride. However, oils treated with the smaller amounts of hydrogen chloride have the tendency to be less prone to reversion than oils not treated at all with hydrogen chloride.

It is believed that the anhydrous hydrogen chloride reacts with the phospholipid present in the oils to form phospholipid hydrochlorides. This belief is based on the observation that when an oil which had reverted was treated with hydrogen chloride in accordance with the present invention to provide a bland oil, and was subsequently subjected to alkali refining, the original reverted flavor and odor of the oil was observed. This indicates that the alkali disassociates the compound formed by the hydrogen chloride treatment, and thus frees the substances which impart the normal reverted flavor and odor characteristics.

The method of the present invention does not take the place of the refining step of deodorization. The relative odoriferous and flavoring substances which are normally removed by deodorization do not seem to be affected by the hydrogen chloride treatment. Thus, to obtain an oil which is bland and not prone to reversion the oil must be subjected to the hydrogen chloride treatment of the present invention and a deodorization treatment.

Illustrative examples of alkali refined oils which may be treated in accordance with the present invention are soybean oil, corn oil, cottonseed oil, safflower oil and fish oil. Since the phospholipid content of these oils varies and it generally is inconvenient to analyze each oil which is to be treated in order to determine the exact quantity of hydrogen chloride needed, it is advisable to treat the oils with an excess of hydrogen chloride. In this respect, it is preferred to treat soybean oil with from about 400 to about 2000 p.p.m. hydrogen chloride; corn oil with from about 200 to about 1000 p.p.m. hydrogen chloride; cottonseed oil from about 100 to about 1000 p.p.m. hydrogen chloride; safflower oil from about 100 to about 900 p.p.m. hydrogen chloride, and fish oil with about 1200 p.p.m. hydrogen chloride.

It is essential in achieving the objects of the present invention that the present method be carried out under substantially anhydrous conditions. For the purposes of this invention, substantially anhydrous conditions means that the mixture of oil and hydrogen chloride presents a single phase. Under normal conditions, the limit of solubility of water in oils varies between about 0.04 and 0.14 percent by weight.

Contacting the oils with substantially anhydrous hydrogen chloride may be accomplished by a variety of methods, e.g., by passing the hydrogen chloride through the oils, by contacting a thin film of the oils with hydrogen chloride, or by providing an atmosphere of hydrogen chloride over the oils so that it diffuses into the oil. It is preferred, because of economic and other factors, to pass the hydrogen chloride through the oils. When this method is used, the objective of the present invention is achieved practically instantaneously, i.e., substantially preventing reversion of the oils or rendering oils which have already reverted substantially odorless and flavorless.

The temperature of the oil during the treatment may vary over a relatively wide range, but it is preferred to carry out the treatment in a temperature range of from about ambient to about 150° C. Lower and higher temperatures may be used, for instance, from the congeal temperature of the oil, i.e., about 5° C., to its decomposition point, i.e., about 225° C. The higher temperatures are not preferred since the hydrogen chloride tends to attack or oxidize the equipment in which the treatment is being performed, and there is a tendency for the oils to oxidize more readily at such temperatures.

It is advantageous to use the present method to treat edible oils which have been previously alkali refined by methods well known in the art. Preferably, the present method is used prior to deodorizing the oils. This provides the benefit that in the case where excess hydrogen chloride has been used it is removed during deodorization. The oil may also be heated to remove excess hydrogen chloride. The normal bleaching treatment of edible oils may be performed before or after the hydrogen chloride treatment.

In order to more clearly disclose the nature of the present invention, specific examples will hereinafter be described. It should be understood, however, that this is done solely by way of example and is intended neither to delineate the scope of the invention nor limit the ambit of the appended claims. As used herein the term p.p.m. refers to parts by million by weight and is based on the weight of the oil, and the term percentages is intended to refer to percent by weight unless otherwise specified.

The glass laboratory deodorizer referred to herein is the Scientific Glass Laboratory deodorizer Cat. No. JD2370. The oils were deodorized in this deodorizer at a pressure of 0.5 to 1 mm. Hg, an oil temperature of 225° C. and for a time of 45 minutes at a steam rate of 10 to 12 g./hour. The pilot plant deodorizer referred to is the Girdler Co., 400 lb. Batch Pilot Plant Deodorizer. The oils were deodorized in this deodorizer at a pressure of 4 to 6 mm. Hg, an oil temperature of 450° F. and for a time of one hour at a steam rate of 12 lbs./hour.

EXAMPLE 1

A drum of commercial alkali refined, bleached and deodorized corn salad oil containing 0.1 percent phospholipids, calculated as lecithin, was held at ambient temperatures (60°–85° F.) for thirty days without access to air. The oil had a reverted flavor. Dry HCl gas (0.003 mole) (0.11 g.) was passed over a period of 3 minutes through a glass sparger immersed in 1340 g. of the oil at ambient temperature. The oil was then steam deodorized in a glass laboratory deodorizer. A taste panel rated this oil at a level of 8.5, on the basis of a refined corn salad oil (not reverted) being rated at 10. When the reverted oil was simply steam deodorized in a glass laboratory deodorizer, the oil was rated 8.5 by the taste panel, but the observation was made that the oil had a slightly reverted flavor which was not present in the oil treated by the method of the present invention.

The untreated oil (simply deodorized) and the HCl treated oil were placed in an oven maintained at a temperature of 145° F. After 12 days of storage in the oven, the oils were cooled and rated by a taste panel. The taste panel rated the HCl treated oil 8, whereas the untreated oil was rated 7, on the basis of a refined corn salad oil (not reverted) being rated 10.

EXAMPLE 2

A sample of 1660 g. of commercial degummed, alkali refined, bleached and deodorized soybean salad oil at ambient temperature was treated with 0.33 g. of dry HCl gas over a period of about 30 seconds by passing the gas through the oil by the use of a sintered glass sparger. The treated oil was allowed to stand at ambient temperature for 40 minutes and was then deodorized in a glass laboratory deodorizer.

A second sample of the same oil was treated with HCl gas in the manner described above but using 1600 g. of oil and 1.7 g. of dry HCl gas. The treated oil was allowed to stand at ambient temperature for 45 minutes, and was then deodorized in a glass laboratory deodorizer.

Both treated oils were excellent in flavor, but the oil treated with 1.7 g. of HCl gas was more bland.

The treated oil samples were placed in an oven maintained at a temperature of 145° F. The oil sample treated with 0.33 g. of HCl gas reverted after a storage time of 18 days, whereas the oil sample treated with 1.7 g. of HCl gas did not revert after a storage time of 34 days.

EXAMPLE 3

Four hundred pounds of commercial alkali refined, bleached and deodorized soybeean oil were treated with with 80 g. of dry HCl gas over a period of 20 minutes in the manner described in Example 2. The oil was deodorized in a pilot plant deodorizer. The oil was rated by a taste panel as being excellent.

This treated oil and oil which was untreated were used to deep fry batches of towel dried, thin sliced, raw potatoes (potato chips). The oils were maintained at a temperature in the range of 365–375° F. for frying. Two thousand ml. samples of the oils and 50 g. batches of the potato chips were used for frying. After each batch of potato chips was fried they were evaluated by a taste panel. Some typical results of this evaluation are shown in the following table.

TABLE I

| Test No. | Total no. of batches of chips fried | Total time (min.) oil held at 365–375° F. | Taste of potato chips From treated oil | From untreated oil |
|---|---|---|---|---|
| A | 1 | 30 | Excellent | Good. |
| B | 5 | 75 | ____do | Slightly Beany. |
| C | 14 | 185 | ____do | Strong Beany. |
| D | 35 | 800 | ____do | Bitter, Fishy. |
| E | 60 | 1,410 | Good, sl. rancid | |

From this table it is apparent that soybean oil treated in accordance with the present invention does not revert on heating for prolonged periods to the extent that untreated soybean oil does.

EXAMPLE 4

A sample of 4500 g. of commercial alkali refined, bleached and deodorized cottonseed oil at ambient temperature was treated with 4.5 g. dry HCl gas in the manner described in Example 2. The oil was held at room temperature for one hour and then steam deodorized in a glass laboratory deodorizer.

This treated oil and the same oil which was untreated were used to deep fry batches of cod fish sticks. Each batch was fried for 3 minutes and then evaluated. The first 10 batches of fish fried in the treated oil were rated as being excellent in flavor, whereas the first 10 batches fried in untreated oil were rated as having a pungent fishy flavor.

The treated and untreated oils were tested according to the procedure described in Example 3 and the first seven batches of potato chips fried in the treated oil were rated as excellent while the first seven batches of potato chips fried in the untreated oil had a musky, off-flavor.

EXAMPLE 5

A sample of 876 g. of commercial alkali refined, bleached and deodorized safflower oil at ambient temperature was treated with 0.73 g. of dry HCl gas in the manner described in Example 2. The oil was then steam deodorized in a glass laboratory deodorizer.

The treated oil and the same oil which was untreated were compared for flavor, and the treated oil was considered as having a better flavor. These oils were placed in an oven maintained at 145° F. After storage in the oven for 34 days the treated and untreated oils were compared for flavor. The treated oil was excellent whereas the untreated oil was reverted in flavor.

EXAMPLE 6

A one-half gallon sample of degummed soybean oil was alkali refined in accordance with AOCS Method Ca9b–52 and bleached with 2 percent bleaching earth. This oil was divided into two portions. One portion was deodorized in a glass laboratory deodorizer and 800 g. of the other portion of the oil was treated with 0.81 g. dry HCl gas in the manner described in Example 2. This treated oil was then steam deodorized in a glass laboratory deodorizer.

The untreated and treated oils were compared for flavor and odor and the untreated oil had the typical soybean oil odor and taste, whereas the treated oil was bland and odorless.

The untreated and treated oils were placed in an oven maintained at 145° F. After storage in the oven for 8 days, the treated oil was still bland and odorless whereas the untreated oil had a reverted flavor.

EXAMPLE 7

A one-half gallon sample of crude herring oil was alkali refined in accordance with AOCS Method Ca9b–52 and bleached with 2 percent bleaching earth. This oil was divided into two portions. One portion was deodorized in a glass laboratory deodorizer and 900 g. of the other portion of the oil was treated with 0.81 g. dry HCl gas in the manner described in Example 2. This treated oil was allowed to stand for 30 minutes, and was then deodorized in a glass laboratory deodorizer.

The untreated and treated oils were compared for flavor and the untreated oil had a fishy odor and taste whereas the treated oil was bland and odorless.

The untreated and treated oils were placed in an oven maintained at 145° F. After storage in the oven for 2 days and compared for flavor the treated oil was bland whereas the untreated oil had a reverted flavor.

EXAMPLE 8

A 4700 g. sample of alkali refined, bleached and deodorized soybean oil was treated with dry HCl gas in the manner described in Example 2. The oil had a bland flavor. This oil was then alkali refined in accordance with AOCS Method Ca9b–52 (the titration for free acids included neutralization of added HCl. The titration indicated that 1.0 g. NaOH was required but 1.5 g. was used.). Immediately after alkali refining, the oil reverted to a pronounced fishy odor and was beany-fishy in flavor, confirming that the HCl had apparently reacted with the phospholipids present in the oil to form phospholipid hydrochlorides. This indicates that the alkali disassociates the compound formed by the HCl treatment, and thus frees the substances which impart the normal reverted flavor and odor characteristics.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A method of preserving the bland flavor of alkali refined vegetable and marine oils which are subject to reversion in flavor and odor on storage, comprising the steps of deodorizing the alkali refined oils and treating the oils from above their congeal temperature to about 225° C. with a small amount of hydrogen chloride in a substantially anhydrous state, the amount of hydrogen chloride being sufficient to substantially prevent the oils from reverting in flavor and odor on storage.

2. A method of preserving the bland flavor of alkali refined vegetable and marine oils as defined in claim 1, wherein the oils are deodorized subsequent to the hydrogen chloride treatment.

3. A method of preserving the bland flavor of alkali refined vegetable and marine oils as defined in claim 2, wherein the temperature of the oil during the hydrogen chloride treatment is below about 150° C.

4. A method of preserving the bland flavor of alkali refined vegetable and marine oils as defined in claim 3, wherein the oil is soybean oil and the amount of hydrogen chloride is from about 400 to about 2000 p.p.m. based on the weight of the oil.

5. A method of preserving the bland flavor of alkali refined vegetable and marine oils as defined in claim 3, wherein the oil is corn oil and the amount of hydrogen chloride is from about 200 to about 1000 p.p.m. based on the weight of the oil.

6. A method of preserving the bland flavor of alkali refined vegetable and marine oils as defined in claim 3, wherein the oil is cottonseed oil and the amount of hydrogen chloride is from about 100 to about 1000 p.p.m. based on the weight of the oil.

7. A method of preserving the bland flavor of alkali refined vegetable and marine oils as defined in claim 3, wherein the oil is safflower oil and the amount of hydrogen chloride is from about 100 to about 900 p.p.m. based on the weight of the oil.

8. A method of improving the flavor of alkali refined vegetable and marine oils whose flavor and odor have reverted in storage including the steps of deodorizing the oils and treating the oils from above their congeal temperature to about 225° C. with a small amount of hydrogen chloride in a substantially anhydrous state, the amount of hydrogen chloride being sufficient to render the oils substantially bland.

9. A method of improving the flavor of alkali refined vegetable and marine oils as defined in claim 8, wherein the oils are treated with hydrogen chloride at a temperature below about 150° C.

10. A deodorized, alkali refined oil selected from the group consisting of vegetable and marine oils prepared by the method defined in claim 1 in which substantially the entire phospholipid content of the oil has been converted to phospholipid hydrochlorides.

References Cited
UNITED STATES PATENTS

| | | | |
|---|---|---|---|
| 2,576,958 | 12/1951 | Mattikow | 260—426 |
| 2,872,465 | 2/1959 | Sims et al. | 99—163 |

FOREIGN PATENTS

| | | | |
|---|---|---|---|
| 784 | 2/1958 | Japan | 99—118 |

JOSEPH M. GOLIAN, Primary Examiner

U.S. Cl. X.R.

99—163; 260—403, 424